W. G. SHAW.
PROCESS FOR FORMING GLASS SHEETS.
APPLICATION FILED AUG. 12, 1915. RENEWED MAR. 7, 1918.

1,283,333.

Patented Oct. 29, 1918.
2 SHEETS—SHEET 1.

WITNESS:
Julian H. Kendig

INVENTOR.
W. G. Shaw
by Synnestvedt Bradley Lechner Forster
ATTORNEYS.

W. G. SHAW.
PROCESS FOR FORMING GLASS SHEETS.
APPLICATION FILED AUG. 12, 1915. RENEWED MAR. 7, 1918.

1,283,333.

Patented Oct. 29, 1918.
2 SHEETS—SHEET 2.

WITNESS:

INVENTOR.
W. G. Shaw
ATTORNEYS.

UNITED STATES PATENT OFFICE.

WILLIAM G. SHAW, OF CREIGHTON, PENNSYLVANIA.

PROCESS FOR FORMING GLASS SHEETS.

1,283,333.　　　　Specification of Letters Patent.　　Patented Oct. 29, 1918.

Application filed August 12, 1915, Serial No. 45,116. Renewed March 7, 1918. Serial No. 221,100.

*To all whom it may concern:*

Be it known that I, WILLIAM G. SHAW, a citizen of the United States, residing at Creighton, in the county of Allegheny and State of Pennsylvania, have invented a certain new and useful Process for Forming Glass Sheets, of which the following is a specification.

Figure 1:
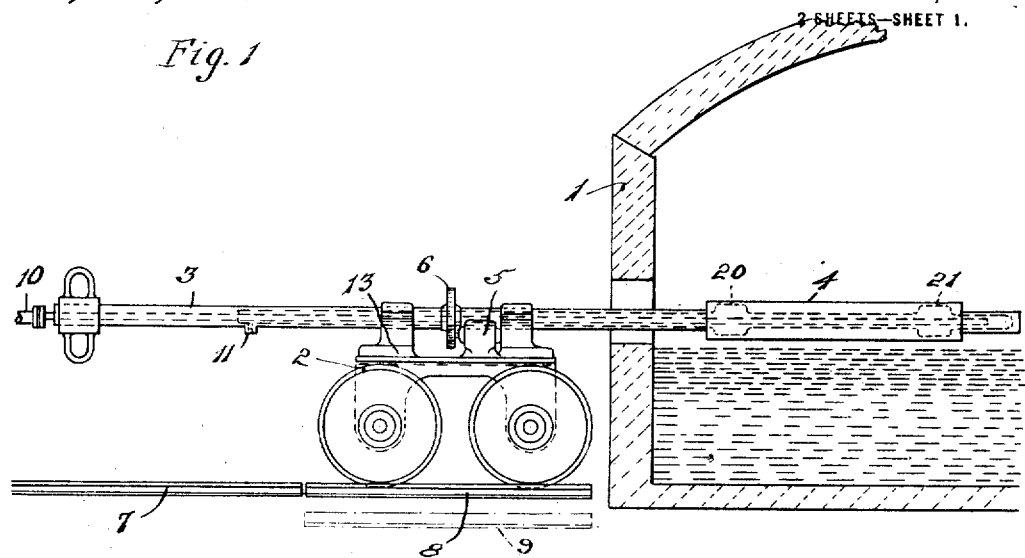
Figure 2:
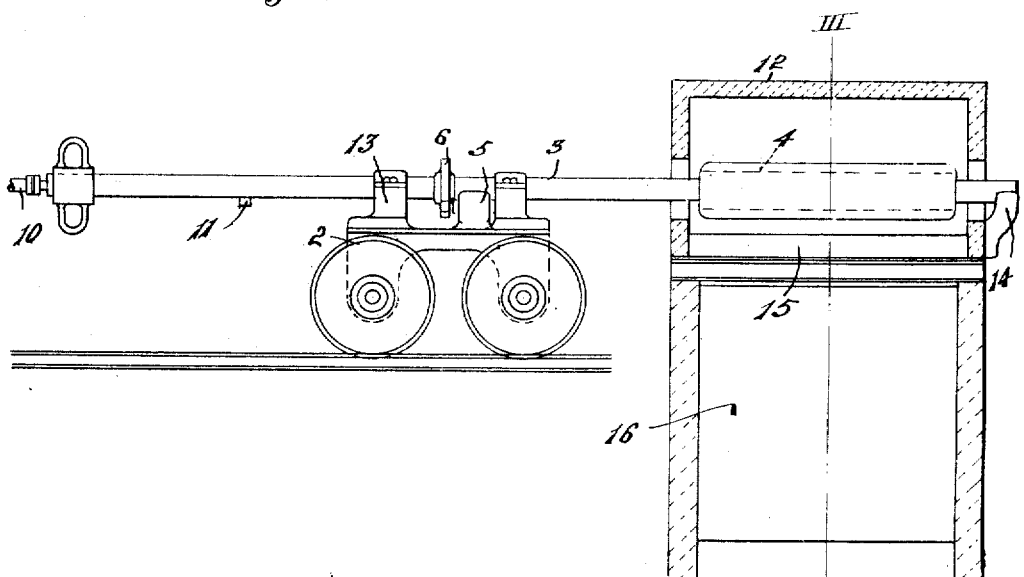
Figure 3:
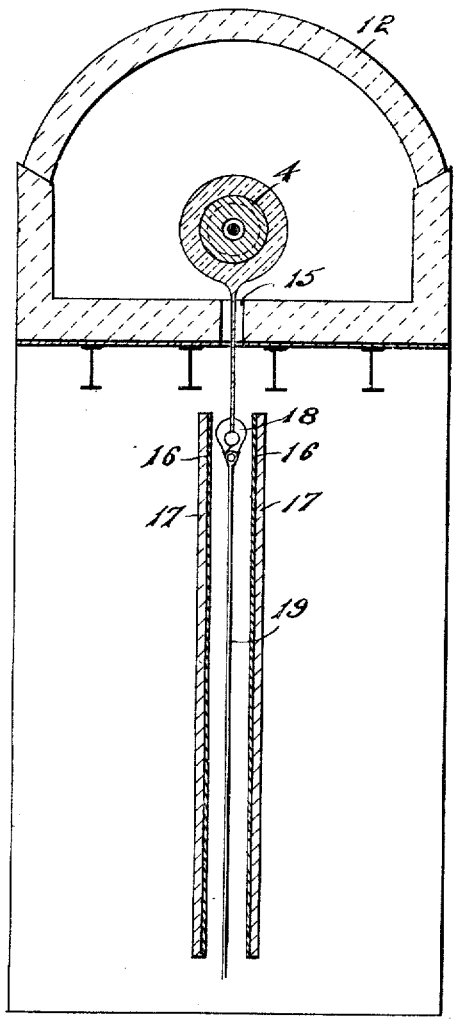
Figure 4:
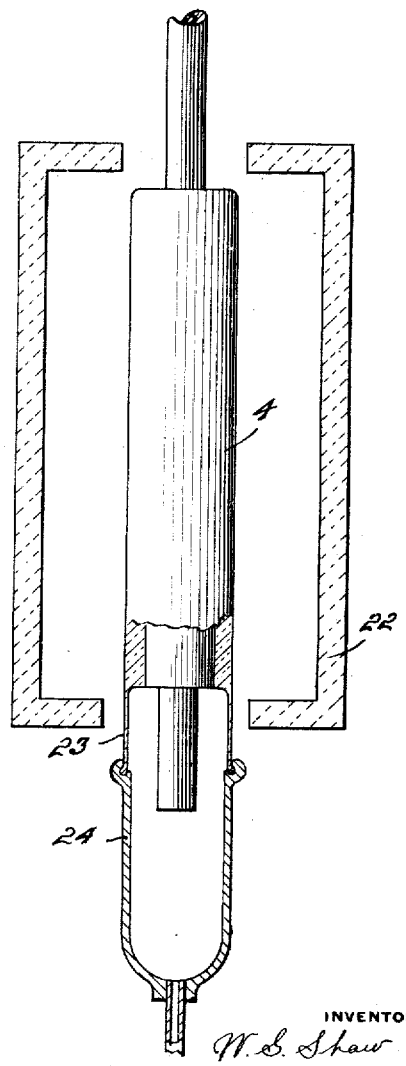

The invention relates to a process for forming glass sheets. The invention has for its primary objects; the provision of a process capable of producing sheet glass of a better finish than that heretofore produced by drawing operations; the provision of a process which can be economically practised and which will produce glass of any desired degree of thickness; and the provision of a process which can be carried out with a relatively cheap and simple apparatus and which will add flexibility to the plant in which it is employed. The accompanying drawings illustrate the method of practising the invention;

Figure 1 being a diagrammatic side elevation view partly in cross-section, illustrating the first part of the process, Fig. 2 being a similar view illustrating the second part of the process, Fig. 3 being an enlarged transverse section on the line III—III of Fig. 2, and Fig. 4 being a diagrammatic sectional view illustrating a modification of the process wherein the cylindrical body of the glass is held vertically instead of horizontally during the reheating operation.

Referring to Fig. 1; 1 is a glass melting tank containing a body of molten glass; 2 is a truck upon which is mounted for rotation the handle 3 carrying at one end the gathering bar 4; 5 is a motor acting through the gearing 6 to rotate the handle 3; 7 is a track upon which the truck runs, and 8 is a continuation of the track 7 mounted upon a vertically movable platform 9.

The first step in the operation is to bring the parts in the position shown in Fig. 1. The platform 9 is then lowered, thus immersing the gathering bar 4 in the glass, at which time the motor is operated to rotate the bar. The bar is then removed from the glass by raising the platform and the truck is run backward to carry the gathering bar out of the furnace, thus permitting the coating of glass collected thereon to cool. This operation is then repeated a number of times until a relatively thick cylinder of glass is collected on the gathering rod 4. In some instances it will be desirable to rotate the bar after its removal from the glass and while the bar is being removed from the furnace in order to prevent the coating of glass from running and becoming thicker on the lower side of the bar than at other parts, and my invention contemplates the manipulation of the bar in any way necessary to secure a uniform coating of glass upon the bar. If desired, the lowering of the bar might be accomplished without lowering the platform, this of course being immaterial in so far as the process is concerned. If desired, some other transporting means than the truck may be used, as for instance a crane. In order to prevent the handle 3 from being overheated it is preferably made hollow as indicated in dotted lines, and water-cooled by a flow of water which circulates from the inlet 10 to the far end of the bar and then returns, flowing out of the outlet 11.

After a sufficient body of glass has been gathered on the bar 4 the truck is run along the track 7 until it arrives at the position shown in Fig. 2, at which time the truck is adjacent a reheating furnace 12. In order to facilitate the turning of the handle 3 and the bar 4 so that the truck itself will not need to be switched, the upper portion 13 of the truck is made to rotate in a horizontal plane with respect to the lower part. The reheating furnace 12 is supplied with heat in any desired way such as by burners or regenerators, the method of supplying heat being immaterial in so far as my present invention is concerned, and the right hand end of the furnace is provided with a support or rest 14 for the end of the bar 3 so that such bar may be held in a perfectly horizontal position. In the floor of the furnace immediately below the gathering bar 4 is a slot 15 (Fig. 3), and below this slot are a pair of asbestos sheets 16 supported upon metal plates 17. A clamp 18 is also provided operable from the rod 19.

When the gathering bar has been moved to the position shown in Fig. 2, heat is applied to soften the body of glass on the bar to such an extent that it will flow or run down by gravity in the form of a sheet, such sheet passing through the slot 15. This sheet flows or runs down between the shields 16, 16, when the two shields are moved together to grip the sheet which is then cracked off above the shields, the two shields serving to carry the sheet of glass to an annealing furnace. In case there is a sufficient amount of glass upon the gathering bar to form other sheets the operation is repeated. The clamp 18 is employed for the lower edge of the shield and applying tension thereto when it is desired to draw a thinner sheet of glass, and if desired a retarding means might be used instead of a drawing means. The speed at which the sheet is formed and its thickness may also be varied by regulating the temperature in the reheating furnace 12. Various other arrangements might also be employed for taking care of the sheet of glass, and if desired annealing it as formed. The asbestos sheets are preferably employed to retard the rapidity of cooling and so prevent the glass from cracking.

The gathering rod 4 is preferably cored out larger at its ends as indicated at 20 and 21, in order to slightly cool the body of glass at these points as compared with the central portion. This causes the edges of the glass sheet formed to harden more quickly, counteracting the natural tendency of the glass sheet to pull in toward the center of the sheet.

This method of forming glass sheets has certain advantages as compared with the processes now employed for drawing glass sheets. One advantage lies in the fact that sheets of any desired thickness may be drawn and the surfaces thereof will be absolutely flat and smooth. Another advantage resides in the superior finish of the glass, such finish being due to the fact that the glass is reheated to the flowing or drawing point and subsequently cooled, the surface of the glass thus being hotter than is the case where the sheet of glass is drawn from the cooled surface of a body of glass as in the present practice. A very perfect body of glass can be collected upon the gathering bar 4 since this body of glass is taken directly from the refined glass of the tank 1. Glass can be kept in a much better condition in a melting tank of this character than in the dog houses or extensions from which it is now the practice to draw glass, and there are no very wide variations of temperature in the glass tending to spoil its quality such as is the case where the drawing occurs from drawing extensions. The process also permits of great flexibility in the plant in which it is employed since as many gathering rods and reheating apparatus can be employed as is necessary to take care of the output of the main melting tank, the capacity of the plant being limited only by that of the melting tank.

Fig. 4 illustrates a modification in which the gathering bar 4 is reheated in a vertical position in the furnace 22 so that the glass flows vertically in the form of a cylinder 23 instead of a flat sheet as in the other type of construction. In order to regulate the speed of movement downward a bait 24 may be employed which is made to adhere to the end of a cylinder and supplied with air to prevent the cylinder from collapsing. This method of operation of course necessitates mechanism for shifting the gathering bar from its horizontal gathering position to the vertical position indicated in Fig. 4. It will be seen that the generic idea as involved in this type of construction is the same as in the other type, the only distinction being that the gathering bar is reheated in a different position, thus forming a cylindrical sheet instead of the flat sheet of the other type of apparatus. The process is of course capable of being carried out by a great variety of modified types of apparatus, and my invention relates to the broad features of procedure rather than to any particular type of apparatus, the ones shown serving to merely illustrate the practice involved.

What I claim is:

1. The process of forming glass sheets which consists in gathering a body of glass in the form of a cylinder upon an elongated horizontally positioned member and permitting it to cool, reheating the body of glass until it flows therefrom by gravity in the form of a sheet, continuing the heating during the flow, and permitting the sheet thus formed to pass into an area of lower temperature and harden.

2. The process of forming glass sheets which consists in gathering a body of glass upon an elongated horizontally positioned member and permitting it to cool, reheating the body of glass with the said member in a horizontal position until the glass flows therefrom by gravity in the form of a flat sheet, and permitting the sheet thus formed to pass into an area of lower temperature and harden.

3. The process of forming glass sheets which consists in gathering a cylindrical body of glass upon a bar by repeatedly dipping the bar in molten glass, while such a bar is held in a horizontal position, rotating it and cooling until the desired body of glass is collected, then reheating the body of glass until it flows down by gravity in the form of a sheet, continuing the heating during the flow of glass, and permitting the sheet thus formed to pass into an area of lower temperature and harden.

4. The process of gathering a cylindrical body of glass which consists in lowering a bar circular in cross-section and held horizontally into a body of glass, rotating the bar and raising it, permitting the coating of glass to harden and then repeating the operation until a cylinder of glass substantially uniform thickness of glass is secured.

5. The process of forming a glass sheet from a cylindrical body of glass, which consists in heating the body of glass until the surface is fluid and flows from the body in a sheet, continuing the heating as the flow continues and permitting the sheet thus formed to harden.

6. The process of forming a glass sheet from a cylindrical body of glass, which consists in heating the body of glass until the surface is fluid while the body is held in a horizontal position and flows from the body in a flat sheet, and permitting the sheet thus formed to pass into a cooler medium and harden.

7. The process of forming a glass sheet from a cylindrical body of glass, which consists in heating the body of glass until the surface is fluid, while the body is held in a horizontal position and flows from the body in a flat sheet, and permitting the sheet thus formed to pass into a cooler medium and harden, the temperature of the end portions of the said body being somewhat reduced as compared with the central portion.

8. The process of forming a glass sheet from a cylindrical body of glass, which consists in heating the body of glass until the surface is fluid and flows from the body in a sheet, continuing the heating as the flow continues and permitting the sheet thus formed to harden gradually to avoid cracking.

9. The process of forming glass sheets which consists in gathering a body of glass upon a cylindrical metal bar by dipping the bar in molten glass, rotating the bar held in a horizontal position and removing from the glass to permit the coating to harden, and repeating the operation until the desired body of glass is collected, then reheating the glass until it flows from the body of glass by gravity in the form of a sheet and permitting the sheet thus formed to pass into an area of lower temperature and harden, the said metal bar being water cooled.

10. The process of forming glass sheets which consists in gathering a body of glass upon an elongated horizontally positioned member and permitting it to cool, reheating the body of glass until it flows therefrom by gravity in the form of a sheet, and permitting the sheet thus formed to pass into an area of lower temperature and harden, tension being applied to the sheet to supplement the force of gravity and regulate the thickness of the sheet.

11. The process of forming glass sheets which consists in gathering a body of glass upon an elongated horizontally positioned member and permitting it to cool, reheating the body of glass until it flows therefrom by gravity in the form of a sheet, continuing the heating coincident with the flow, and permitting the sheet thus formed to pass into an area of lower temperature and harden, the thickness of the sheet being regulated by varying the intensity of the heat applied.

W. G. SHAW.